US008027268B2

(12) United States Patent
Preston et al.

(10) Patent No.: US 8,027,268 B2
(45) Date of Patent: Sep. 27, 2011

(54) METHOD AND APPARATUS FOR DYNAMIC CONFIGURATION OF MULTIPROCESSOR SYSTEM

(75) Inventors: Dan Alan Preston, Bainbridge Island, WA (US); Robert Pierce Lutter, Tacoma, WA (US)

(73) Assignee: Eagle Harbor Holdings, LLC, Bainbridge Island, WA (US)

( * ) Notice: Subject to any disclaimer, the term of this patent is extended or adjusted under 35 U.S.C. 154(b) by 0 days.

(21) Appl. No.: 12/258,234

(22) Filed: Oct. 24, 2008

(65) Prior Publication Data

US 2009/0047904 A1    Feb. 19, 2009

Related U.S. Application Data

(63) Continuation of application No. 11/462,958, filed on Aug. 7, 2006, which is a continuation of application No. 09/841,915, filed on Apr. 24, 2001, now Pat. No. 7,146,260.

(51) Int. Cl.
*H04L 12/26* (2006.01)

(52) U.S. Cl. ..... 370/252; 370/270; 370/389; 340/425.5; 369/1; 369/2; 455/41.2; 715/727

(58) Field of Classification Search .......... None
See application file for complete search history.

(56) References Cited

U.S. PATENT DOCUMENTS

| | | | |
|---|---|---|---|
| 2,995,318 A | 8/1961 | Cocharo | |
| 4,303,978 A | 12/1981 | Shaw et al. | |
| 4,528,563 A | 7/1985 | Takeuchi | |
| 4,591,976 A | 5/1986 | Webber et al. | |
| 4,829,434 A | 5/1989 | Karmel et al. | |
| 4,907,159 A | 3/1990 | Mauge et al. | |
| 5,008,678 A | 4/1991 | Herman | |
| 5,031,330 A | 7/1991 | Stuart | |
| 5,045,937 A | 9/1991 | Myrick | |
| 5,111,401 A | 5/1992 | Everett, Jr. et al. | |
| 5,115,245 A | 5/1992 | Wen et al. | |
| 5,245,909 A | 9/1993 | Corrigan et al. | |
| 5,287,199 A | 2/1994 | Zoccolillo | |
| 5,303,297 A | 4/1994 | Hillis | |

(Continued)

FOREIGN PATENT DOCUMENTS

DE    3125151    1/1983

(Continued)

OTHER PUBLICATIONS

IEEE, "IEEE Standard for Information Technology—POSIX Based Supercomputing Application Environment Profile," Jun. 14, 1995, 72 pages.

(Continued)

*Primary Examiner* — Ayaz Sheikh
*Assistant Examiner* — Nicholas Sloms
(74) *Attorney, Agent, or Firm* — Stolowitz Ford Cowger LLP

(57) ABSTRACT

A multiprocessor system used in a car, home, or office environment includes multiple processors that run different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

25 Claims, 12 Drawing Sheets

U.S. PATENT DOCUMENTS

| | | | |
|---|---|---|---|
| 5,339,086 A | 8/1994 | DeLuca et al. |
| 5,341,301 A | 8/1994 | Shirai et al. |
| 5,438,361 A | 8/1995 | Coleman |
| 5,471,214 A | 11/1995 | Faibish et al. |
| 5,506,963 A | 4/1996 | Ducateau et al. |
| 5,532,706 A | 7/1996 | Reinhardt et al. |
| 5,552,773 A | 9/1996 | Kuhnert |
| 5,572,201 A | 11/1996 | Graham |
| 5,581,462 A | 12/1996 | Rogers |
| 5,585,798 A | 12/1996 | Yoshioka et al. |
| 5,617,085 A | 4/1997 | Tsutsumi et al. |
| 5,646,612 A | 7/1997 | Byon |
| 5,749,060 A | 5/1998 | Graf et al. |
| 5,751,211 A | 5/1998 | Nishimura |
| 5,761,320 A | 6/1998 | Farinelli et al. |
| 5,786,998 A | 7/1998 | Neeson et al. |
| 5,794,164 A | 8/1998 | Beckert et al. |
| 5,872,508 A | 2/1999 | Taoka |
| 5,895,240 A | 4/1999 | Chuang et al. |
| 5,907,293 A | 5/1999 | Tognazzini |
| 5,915,214 A | 6/1999 | Reece et al. |
| 5,943,427 A | 8/1999 | Massie et al. |
| 5,948,040 A | 9/1999 | DeLorme et al. |
| 5,951,620 A | 9/1999 | Ahrens et al. |
| 5,959,536 A | 9/1999 | Chambers |
| 5,963,092 A | 10/1999 | Van Zalinge et al. |
| 5,964,822 A | 10/1999 | Alland |
| 5,966,658 A | 10/1999 | Kennedy et al. |
| 5,969,598 A | 10/1999 | Kimura |
| 5,977,906 A | 11/1999 | Ameen |
| 5,983,092 A | 11/1999 | Whinnett et al. |
| 5,983,161 A | 11/1999 | Lemelson et al. |
| 6,009,330 A | 12/1999 | Kennedy et al. |
| 6,009,403 A | 12/1999 | Sato |
| 6,028,537 A | 2/2000 | Suman et al. |
| 6,028,548 A | 2/2000 | Farmer |
| 6,032,089 A | 2/2000 | Buckely |
| 6,054,950 A | 4/2000 | Fontana |
| 6,060,989 A | 5/2000 | Gehlot |
| 6,061,709 A | 5/2000 | Bronte |
| 6,075,467 A | 6/2000 | Ninagawa |
| 6,097,285 A | 8/2000 | Curtin |
| 6,128,608 A | 10/2000 | Barnhill |
| 6,148,261 A | 11/2000 | Obradovich et al. |
| 6,150,961 A | 11/2000 | Alewine |
| 6,154,123 A | 11/2000 | Kleinberg |
| 6,161,071 A | 12/2000 | Shuman et al. |
| 6,163,711 A | 12/2000 | Juntunen et al. |
| 6,166,627 A | 12/2000 | Reeley |
| 6,167,253 A | 12/2000 | Farris et al. |
| 6,169,894 B1 | 1/2001 | McCormick et al. |
| 6,175,728 B1 | 1/2001 | Mitama |
| 6,175,782 B1 | 1/2001 | Obradovich et al. |
| 6,181,922 B1 | 1/2001 | Iwai |
| 6,181,994 B1 | 1/2001 | Colson et al. |
| 6,182,006 B1 | 1/2001 | Meek |
| 6,185,491 B1 | 2/2001 | Gray |
| 6,202,027 B1 | 3/2001 | Alland et al. |
| 6,203,366 B1 | 3/2001 | Muller et al. |
| 6,204,804 B1 | 3/2001 | Anderson |
| 6,226,389 B1 | 5/2001 | Lebelson et al. |
| 6,233,468 B1 | 5/2001 | Chen |
| 6,236,652 B1 | 5/2001 | Preston |
| 6,240,365 B1 | 5/2001 | Bunn |
| 6,243,450 B1 | 6/2001 | Jansen et al. |
| 6,252,544 B1 | 6/2001 | Hoffberg |
| 6,275,231 B1 | 8/2001 | Obradovich |
| D448,366 S | 9/2001 | Youngers |
| 6,292,109 B1 | 9/2001 | Murano et al. |
| 6,292,747 B1 | 9/2001 | Amro et al. |
| 6,294,987 B1 | 9/2001 | Matsuda et al. |
| 6,297,732 B2 | 10/2001 | Hsu et al. |
| 6,298,302 B2 | 10/2001 | Walgers et al. |
| 6,314,326 B1 | 11/2001 | Fuchu |
| 6,326,903 B1 | 12/2001 | Gross et al. |
| 6,327,536 B1 | 12/2001 | Tsuji et al. |
| 6,362,748 B1 | 3/2002 | Huang |
| 6,374,286 B1 | 4/2002 | Gee et al. |
| 6,377,860 B1 | 4/2002 | Gray |
| 6,382,897 B2 | 5/2002 | Mattio et al. |
| 6,389,340 B1 | 5/2002 | Rayner |
| 6,401,029 B1 | 6/2002 | Kubota |
| 6,405,132 B1 | 6/2002 | Breed et al. |
| 6,408,174 B1 | 6/2002 | Steijer |
| 6,417,782 B1 | 7/2002 | Darnell |
| 6,421,429 B1 | 7/2002 | Merritt |
| 6,429,789 B1 | 8/2002 | Kiridena et al. |
| 6,429,812 B1 | 8/2002 | Hoffberg |
| 6,430,164 B1 | 8/2002 | Jones |
| 6,442,485 B2 | 8/2002 | Evans et al. |
| 6,445,308 B1 | 9/2002 | Koike |
| 6,452,484 B1 | 9/2002 | Drori |
| 6,484,080 B2 | 11/2002 | Breed |
| 6,493,338 B1 | 12/2002 | Preston |
| 6,496,107 B1 | 12/2002 | Himmelstein |
| 6,496,117 B2 | 12/2002 | Gutta |
| 6,496,689 B1 | 12/2002 | Keller et al. |
| 6,505,100 B1 * | 1/2003 | Stuempfle et al. .................. 701/1 |
| 6,515,595 B1 | 2/2003 | Obradovich et al. |
| 6,522,875 B1 | 2/2003 | Dowling et al. |
| 6,559,773 B1 | 5/2003 | Berry |
| 6,584,403 B2 | 6/2003 | Bunn |
| D479,228 S | 9/2003 | Sakaguchi et al. |
| 6,614,349 B1 | 9/2003 | Proctor et al. |
| 6,615,137 B2 | 9/2003 | Lutter |
| 6,616,071 B2 | 9/2003 | Kitamura et al. |
| 6,622,083 B1 | 9/2003 | Knockeart et al. |
| 6,629,033 B2 | 9/2003 | Preston |
| 6,641,087 B1 | 11/2003 | Nelson |
| 6,647,270 B1 | 11/2003 | Himmelstein |
| 6,670,912 B2 | 12/2003 | Honda |
| 6,675,081 B2 | 1/2004 | Shuman et al. |
| 6,681,121 B1 | 1/2004 | Preston |
| 6,690,681 B1 | 2/2004 | Preston |
| 6,707,421 B1 | 3/2004 | Drury et al. |
| 6,708,100 B2 | 3/2004 | Russell et al. |
| 6,714,139 B2 | 3/2004 | Saito et al. |
| 6,725,031 B2 | 4/2004 | Watler et al. |
| 6,734,799 B2 | 5/2004 | Munch |
| 6,738,697 B2 | 5/2004 | Breed |
| 6,771,208 B2 | 8/2004 | Lutter et al. |
| 6,771,629 B1 | 8/2004 | Preston |
| 6,778,073 B2 | 8/2004 | Lutter |
| 6,778,924 B2 | 8/2004 | Hanse |
| 6,782,315 B2 | 8/2004 | Lu et al. |
| 6,785,551 B1 | 8/2004 | Richard |
| 6,792,351 B2 | 9/2004 | Lutter |
| 6,816,458 B1 | 11/2004 | Kroon |
| 6,901,057 B2 | 5/2005 | Rune |
| 6,906,619 B2 | 6/2005 | Williams |
| 6,920,129 B2 | 7/2005 | Preston |
| 6,925,368 B2 | 8/2005 | Funkhouser et al. |
| 6,952,155 B2 | 10/2005 | Himmelstein |
| 6,972,669 B2 | 12/2005 | Saito |
| 6,973,030 B2 | 12/2005 | Pecen |
| 6,980,092 B2 | 12/2005 | Turnbull |
| 6,993,511 B2 | 1/2006 | Himmelstein |
| 7,000,469 B2 | 2/2006 | Foxlin et al. |
| 7,006,950 B1 | 2/2006 | Greiffenhagen et al. |
| 7,024,363 B1 | 4/2006 | Comerford et al. |
| 7,079,993 B2 | 7/2006 | Stephenson et al. |
| 7,089,206 B2 | 8/2006 | Martin |
| 7,092,723 B2 | 8/2006 | Himmelstein |
| 7,120,129 B2 | 10/2006 | Ayyagari et al. |
| 7,123,926 B2 | 10/2006 | Himmelstein |
| 7,146,260 B2 | 12/2006 | Preston |
| 7,151,768 B2 | 12/2006 | Preston |
| 7,158,956 B1 | 1/2007 | Himmelstein |
| 7,164,662 B2 | 1/2007 | Preston |
| 7,171,189 B2 | 1/2007 | Bianconi et al. |
| 7,178,049 B2 | 2/2007 | Lutter |
| 7,187,947 B1 | 3/2007 | White et al. |
| 7,206,305 B2 | 4/2007 | Preston |
| 7,207,042 B2 | 4/2007 | Smith et al. |
| 7,215,965 B2 | 5/2007 | Fournier |
| 7,221,669 B2 | 5/2007 | Preston |
| 7,239,949 B2 | 7/2007 | Lu et al. |

| | | |
|---|---|---|
| 7,249,266 B2 | 7/2007 | Margalit |
| 7,257,426 B1 * | 8/2007 | Witkowski et al. ......... 455/569.2 |
| 7,263,332 B1 | 8/2007 | Nelson |
| 7,269,188 B2 | 9/2007 | Smith |
| 7,272,637 B1 | 9/2007 | Himmelstein |
| 7,274,988 B2 | 9/2007 | Mukaiyama |
| 7,277,693 B2 | 10/2007 | Chen et al. |
| 7,283,567 B2 | 10/2007 | Preston |
| 7,283,904 B2 | 10/2007 | Benjamin |
| 7,286,522 B2 | 10/2007 | Preston |
| 7,317,696 B2 | 1/2008 | Preston |
| 7,343,160 B2 | 3/2008 | Morton |
| 7,375,728 B2 | 5/2008 | Donath |
| 7,379,707 B2 | 5/2008 | DiFonzo |
| 7,411,982 B2 | 8/2008 | Smith |
| 7,418,476 B2 | 8/2008 | Salesky |
| 7,450,955 B2 | 11/2008 | Himmelstein |
| 7,508,810 B2 | 3/2009 | Moinzadeh |
| 7,509,134 B2 | 3/2009 | Fournier et al. |
| 7,587,370 B2 | 9/2009 | Himmelstein |
| 7,594,000 B2 | 9/2009 | Himmelstein |
| 7,596,391 B2 | 9/2009 | Himmelstein |
| 7,599,715 B2 | 10/2009 | Himmelstein |
| 7,614,055 B2 | 11/2009 | Buskens et al. |
| 7,617,085 B2 | 11/2009 | Bobok et al. |
| 7,664,315 B2 | 2/2010 | Woodfill |
| 7,733,853 B2 | 6/2010 | Moinzadeh et al. |
| 7,747,281 B2 | 6/2010 | Preston |
| 7,848,763 B2 | 12/2010 | Fournier et al. |
| 2001/0008992 A1 | 7/2001 | Saito et al. |
| 2001/0009855 A1 | 7/2001 | L'Anson |
| 2001/0018639 A1 | 8/2001 | Bunn |
| 2001/0022927 A1 | 9/2001 | Mattio et al. |
| 2001/0041556 A1 | 11/2001 | Laursen et al. |
| 2001/0048749 A1 | 12/2001 | Ohmura et al. |
| 2001/0051853 A1 | 12/2001 | Evans |
| 2002/0012329 A1 | 1/2002 | Atkinson et al. |
| 2002/0022927 A1 | 2/2002 | Lemelson et al. |
| 2002/0070852 A1 | 6/2002 | Trauner |
| 2002/0087886 A1 | 7/2002 | Ellis |
| 2002/0095501 A1 * | 7/2002 | Chiloyan et al. ............. 709/227 |
| 2002/0105423 A1 * | 8/2002 | Rast ............................. 340/479 |
| 2002/0119766 A1 | 8/2002 | Bianconi et al. |
| 2002/0142759 A1 | 10/2002 | Newell et al. |
| 2002/0144010 A1 | 10/2002 | Younis et al. |
| 2002/0177429 A1 | 11/2002 | Watler et al. |
| 2002/0198925 A1 | 12/2002 | Smith et al. |
| 2003/0004633 A1 | 1/2003 | Russell et al. |
| 2003/0009270 A1 | 1/2003 | Breed |
| 2003/0011509 A1 | 1/2003 | Honda |
| 2003/0060188 A1 | 3/2003 | Gidron et al. |
| 2003/0065432 A1 | 4/2003 | Shuman et al. |
| 2003/0110113 A1 | 6/2003 | Martin |
| 2003/0158614 A1 | 8/2003 | Friel |
| 2003/0201365 A1 | 10/2003 | Nelson |
| 2003/0201929 A1 | 10/2003 | Lutter et al. |
| 2004/0149036 A1 | 8/2004 | Foxlin et al. |
| 2004/0162064 A1 | 8/2004 | Himmelstein |
| 2004/0164228 A1 | 8/2004 | Fogg et al. |
| 2005/0009506 A1 | 1/2005 | Smolentzov |
| 2005/0070221 A1 | 3/2005 | Upton |
| 2005/0080543 A1 | 4/2005 | Lu et al. |
| 2005/0130656 A1 | 6/2005 | Chen |
| 2005/0153654 A1 | 7/2005 | Anderson |
| 2005/0260984 A1 | 11/2005 | Karabinis |
| 2005/0275505 A1 | 12/2005 | Himmelstein |
| 2005/0278712 A1 | 12/2005 | Buskens et al. |
| 2007/0115868 A1 | 5/2007 | Chen |
| 2007/0115897 A1 | 5/2007 | Chen |
| 2008/0092140 A1 | 4/2008 | Doninger et al. |

FOREIGN PATENT DOCUMENTS

| | | |
|---|---|---|
| DE | 3125161 | 1/1983 |
| DE | 4237987 | 5/1994 |
| DE | 19922608 | 11/2000 |
| DE | 19931161 | 1/2001 |
| EP | 0441576 | 8/1991 |
| EP | 841648 | 5/1998 |
| EP | 1355128 | 10/2003 |
| JP | 10-076115 | 10/1999 |
| JP | 200207691 | 7/2000 |
| JP | 2000207691 | 7/2000 |
| WO | 9624229 | 8/1996 |
| WO | WO96/24229 | 8/1996 |
| WO | 9908436 | 2/1999 |
| WO | WO99/08436 | 2/1999 |
| WO | 9957662 | 11/1999 |
| WO | WO99/57662 | 11/1999 |
| WO | 9965183 | 12/1999 |
| WO | WO99/65183 | 12/1999 |
| WO | WO 0029948 | 5/2000 |
| WO | 0040038 | 6/2000 |
| WO | WO00/40038 | 6/2000 |
| WO | 0130061 | 4/2001 |
| WO | WO01/30061 | 4/2001 |
| WO | 0158110 | 8/2001 |
| WO | WO01/58110 | 8/2001 |

OTHER PUBLICATIONS

Luttge, Karsten, "E-Changing API: Outsource Charging to a Payment Service Provider," IEEE; 2001 (pp. 216-222).
Product description of Raytheon RT Secure, "Embedded Hard Real-Time Secure Operating System," Copyright 2000, pp. 1-2.
Product description of Raytheon RT Secure, Copyright 2001, pp. 1-2.
Product description of Raytheon RT Secure, "Development Environment," Copyright 2001, pp. 1-2.
Product description of Raytheon Electronic Systems (ES), Copyright 2002, pp. 1-2.
H. Chung, L. Ojeda, and J. Borenstein, "Sensor Fusion for Mobile Robot Dead-Reckoning with a Precision-Calibrated Fiber Optic Gyroscope," 2001 IEEE International Conference on Robotics and Automation, Seoul, Korea, May 21-26, pp. 1-6.
A. Das, R. Fierro, V. Kumar, J. Ostrowski, J. Speltzer, and C. Taylor, "A Framework for Vision Based Formation Control," IEE Transactions on Robotics and Automation, vol. XX, No. Y, 2001, pp. 1-13.
T. Takezaki, N. Ueki, T. Monowa, H. Kondoh, "Support System for Safe Driving—A Step Toward ITS Autonomous Driving," Hitachi Review, vol. 49, No. 3, 2000, pp. 1-8.
S.G. Goodridge, "Multimedia Sensor Fusion for Intelligent Camera Control and Human-Computer Interaction," Dissertation submitted to the Graduate Faculty of North Carolina State University in partial fulfillment of the requirements for the degree of Doctor of Philosophy in Electrical Engineering, Raleigh, NC, 1997, pp. 1-5.
M. Chantler, G. Russel, and R. Dunbar, "Probabilistic Sensor Fusion for Reliable Workspace Sensing," p. 1-14.
ISIS Project: Sensor Fusion, Linkoping University Division of Automatic Control and Communication Systems in Cooperating with SAAB (Dynamic and Aircraft), 18 pages.
Hitachi Automated Highway System (AHS), Automotive Product, Hitachi, Ltd., Copyright 1994-2002, 8 pages.
Vehicle Dynamics Lab, University of California, Berkeley, funded by BMW, current members: D. Caveney and B. Feldman, "Adaptive Cruise Control," 17 pages.
Counterair: The Cutting Edge, Ch. 2 "The Evolutionary" Trajectory the Fighter Pilot-Here to Stay? AF2025 v3c8-2, Dec. 1996, pp. 1-7.
Counterair: The Cutting Edge, Ch. 4 "The Virtual Trajectory Air Superiority without an 'Air' Force?" AF2025 v3c8-4, Dec. 1996, pp. 1-12.
TNO FEL Annual Review 1998: Quality works, 16 pages.
Boeing News Release, "Boeing Demonstrates JSF Avionics Multi-Sensor Fusion," Seattle, WA, May 9, 2000, pp. 1-2.
Boeing Statement, "Chairman and CEO Phil Condit on the JSF Decision," Washington, D.C., Oct. 26, 2001, pp. 1-2.
Ada 95 Transition Support—Lessons Learned, Sections 3, 4, and 5, CACI, Inc.—Federal, Nov. 15, 1996, 14 pages.
Joint Strike Fighter Terrain Database, ets-news.com "Simulator Solutions" 2002, 3 pages.
MSRC Redacted Proposal, 3.0 Architecture Development, pp. 1-43.
Powerpoint Presentation by Robert Allen—Boeing Phantom Works entitled "Real-Time Embedded Avionics System Security and COTS Operating Systems," Open Group Real-Time Forum, Jul. 18, 2001, 16 pages.

Green Hills Software, Inc., "The AdaMULTI 2000 Integrated Development Environment," Copyright 2002, 7 pages.

Bluetooth Specification version 1.1: Feb. 22, 2001.

Bluetooth Hands-free Profile 1.5 Nov. 25, 2005.

Stirling A: "Mobile Multimedia platforms" Vehicular Technology Conferene Fall 2000. IEEE VTS Fall VTC2000. 52nd Vehicular Technology Conference (CAT. No. 00CH37152).

Nusser R. et al.: "Bluetooth-based wireless connectivity in an automotive environment" Vehicular Technoloty Conference Fall 2000. IEEE VTS Fall VTC2000 52nd Vehicular Techonlogy Conference (CAT. No. 00CH37152).

Martins e f v et al. "design of an OS9 operating system extension for a message-passing multiprocesor" Microprocessors and Microsysetms, IPC Business Press LT. London, BG, vol. 21, No. 9, Apr. 1, 1998, pp. 533-543.

Gutierrez Garcia JJ et al. "Minimizing the effects of jitter in distributed hard real-time systems" Journal of Systems Architecture, Elsevier Science Publishers BV., Amsterdam, NL, vol. 41, No. 6/7. Dec. 15, 1996, pp. 431-447.

International Search Report for PCT/US02/020402; Mailing date Apr. 3, 2003.

International Search Report for PCT/US02/020403; Mailing date Jan. 27, 2003.

International Search Report for PCT/US02/016364; Mailing date Feb. 14, 2003.

International Search Report for PCT/US02/016371; Mailing date Aug. 18, 2003.

Counterair: The Cutting Edge, Ch. 4 "The Virtual Trajectory Air Superiority without an "Air" Force?" AF2025 v3c8-4, Dec. 1996, pp. 1-12.

J. Takezaki, N. Ueki, T. Minowa, H. Kondoh, "Support System for Safe Driving—A Step Toward ITS Autonomous Driving—", Hitachi Review, vol. 49, No. 3, 2000, pp. 1-8.

Specification of the Bluetooth System v1.0.B Dec. 1, 1999.

MyGig.

Embedded Bluetooth Lisbon-Seattle Jan. 23, 2008.

AMIC. Architecture specification release 1, 2001.

Bluetooth advance audio distribution profile specification—May 22, 2003.

Bluetooth audio/video remote control profile—May 22, 2003.

Stolowitz Ford Cowger LLP Listing of Related Cases; May 10, 2010.

Stolowitz Ford Cowger LLP, Listing of Related Cases, Nov. 17, 2010.

Stolowitz Ford Cowger LLP, Listing of Related Cases, Mar. 15, 2011.

* cited by examiner

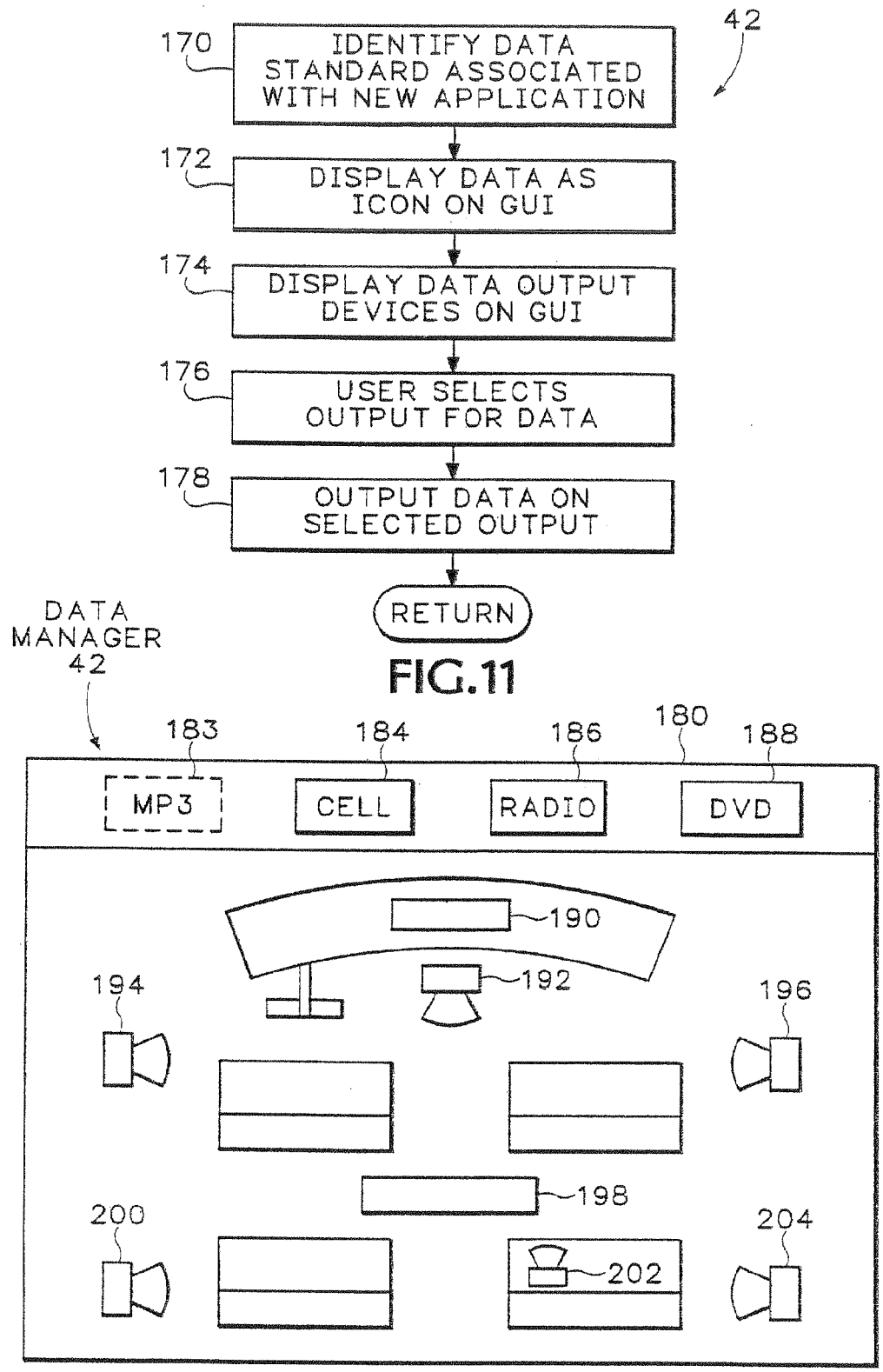

ns that
METHOD AND APPARATUS FOR DYNAMIC CONFIGURATION OF MULTIPROCESSOR SYSTEM This application is a continuation of U.S. patent application Ser. No. 11/462,958 filed Aug. 7, 2006, that is a continuation of U.S. patent application Ser. No. 09/841,915, filed Apr. 24, 2001, now U.S. Pat. No. 7,146,260 issued on Dec. 5, 2006, the disclosures of which are incorporated herein by reference in its entirety.

BACKGROUND

Cars include many different electromechanical and electronic applications. Examples include braking systems, electronic security systems, radios, Compact Disc (CD) players, internal and external lighting systems, temperature control systems, locking systems, seat adjustment systems, speed control systems, mirror adjustment systems, directional indicators, etc. Generally the processors that control these different car systems do not talk to each other. For example, the car radio does not communicate with the car heating system or the car braking system. This means that each one of these car systems operate independently and do not talk to the other car systems. For example, separate processors and separate user interfaces are required for the car temperature control system and for the car audio system. Many of these different car processors may be underutilized since they are only used intermittently.

Even when multiple processors in the car do talk to each other, they are usually so tightly coupled together that it is impossible to change any one of these processors without disrupting all of the systems that are linked together. For example, some cars may have a dashboard interface that controls both internal car temperature and a car radio. The car radio cannot be replaced with a different model and still work with the dashboard interface and the car temperature controller.

Integration of new systems into a car is also limited. Car systems are designed and selected well before the car is ever built. A custom wiring harness is then designed to connect only those car systems selected for the car. A car owner cannot incorporate new systems into the existing car. For example, a car may not originally come with a navigation system. An after market navigation system from another manufacturer cannot be integrated into the existing car.

Because after market devices can not be integrated into car control and interface systems, it is often difficult for the driver to try and operate these after market devices. For example, the car driver has to operate the after market navigation system from a completely new interface, such as the keyboard and screen of a laptop computer. The driver then has to operate the laptop computer not from the front dashboard of the car, but from the passenger seat of the car. This makes many after market devices both difficult and dangerous to operate while driving.

The present invention addresses this and other problems associated with the prior art.

SUMMARY OF THE INVENTION

A multiprocessor system used in a car, home, or office environment includes multiple processors that run different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

BRIEF DESCRIPTION OF THE DRAWINGS

FIGS. 11 and 12 are diagrams showing how a data manager in the DC system operates.

DETAILED DESCRIPTION

Figure 1:
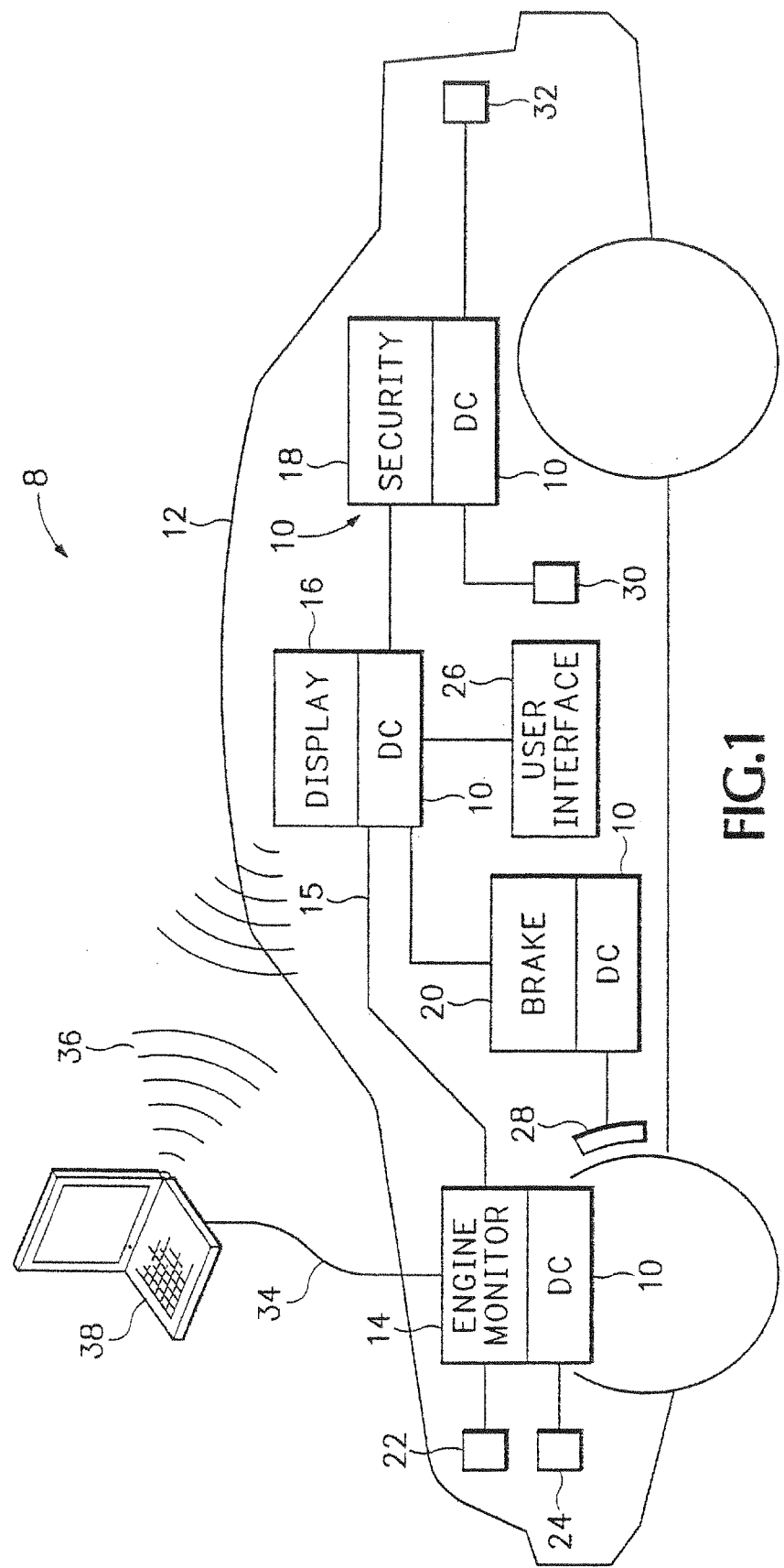
FIG. 1 is a diagram of a car that has multiple processors that each run a Dynamic Configuration (DC) system.

FIG. 1 shows a car 12 that includes a car multiprocessor system 8 having multiple processors 14, 16, 18 and 20. An engine monitor processor 14 monitors data from different sensors 22 and 24 in the car engine. The sensors 22 and 24 can be any sensing device such as sensors that monitor water temperature, oil temperature, fuel consumption, car speed, etc. A brake control processor 20 monitors and controls an Automatic Braking System (ABS) 28. A display processor 16 is used to control and monitor a graphical user interface 26. A security processor 18 monitors and controls latches and sensors 30 and 32 that are used in a car security system.

The processors 14, 16, 18 and 20 all include software that run a Dynamic Configuration (DC) system 10 that enables new processors or devices to be automatically added and removed from the car multiprocessor system 8. The DC system 10 also automatically reconfigures the applications running on different processors according to application failures and other system processing requirements.

For example, the processor 20 may currently be running a high priority brake control application. If the processor 20 fails, the DC system 10 can automatically download the braking application to another processor in car 12. The DC system 10 automatically identifies another processor with capacity to run the braking control application currently running in processor 20. The DC system 10 then automatically downloads a copy of the braking control application to the identified processor. If there is no extra reserve processing resources available, the DC system 10 may replace a non-critical application running on another processor. For example, the DC system 10 may cause the display processor 16 to terminate a current non-critical application and then download the brake control application along with any stored critical data.

The DC system 10 also automatically incorporates new processors or applications into the multiprocessor system 8. For example, a laptop computer 38 can communicate with the engine monitor processor 34 through a hardwired link 34 or communicate to the display processor 16 through a wireless link 36. The DC system 11 automatically integrates the laptop computer 38, or any other processor or device, into the multiprocessor system 8. After integrated into the multiprocessor system 8, not only can the laptop computer 38 transfer data with other processors, but the laptop computer may also run car applications normally run by other processors in car 12.

The DC system 10 allows the car driver to manage how different applications are processed in the car 12. As described above, a car operator may have to run an aftermarket navigation system through a GPS transceiver attached to the laptop computer 38. The car driver has to place the laptop computer 38 in the passengers seat and then operate the laptop computer 38 while driving.

The DC system 10 in the display computer 16 can automatically detect the navigation application running on the laptop computer 38. The display computer 16 notifies the car operator through the user interface 26 that the navigation application has been detected. The car operator can then control the navigation application through the user interface 26. Since the user interface 26 is located in the dashboard of car 12, the car operator no longer has to take his eyes off the road while operating the navigation application.

The description below gives only a few examples of the different processors, devices and applications that can be implemented using the DC system 10. Any single or multi-processor system located either inside or outside of car 12 can communicate and exchange data using the OC system 10. It should also be understood that the DC system 10 can be used in any real-time environment such as between processors in different home or office appliances and different home and office computers.

Figure 2:
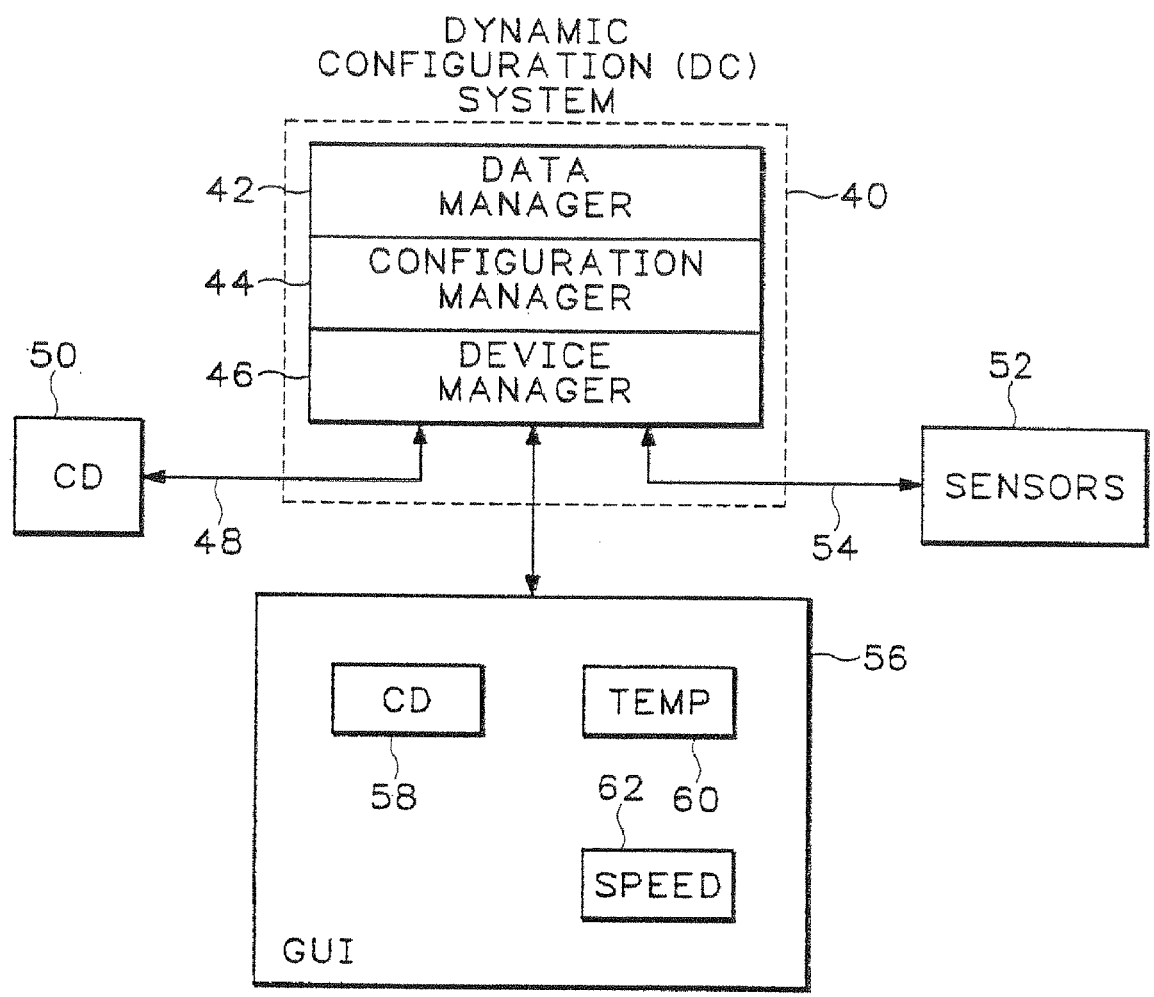
FIG. 2 is a detailed diagram of the dynamic configuration system shown in FIG. 1.

FIG. 2 is a block diagram showing in more detail the Dynamic Control (DC) system 10 located in a processor 40 that makes up part of the multiprocessor system 8 in car 12 (FIG. 1). The DC system 10 includes a device manager 46 that establishes communications with new devices that are to be incorporated into the multiprocessor system 8. A configuration manager 44 in the processor 40 dynamically moves applications between different processors according to user inputs and other monitored conditions in the multiprocessor system 8. A data manager 42 identifies a type of data input or output by a new processor and identifies other processors or devices in the multiprocessor system that can output data from the new device or input data to the new device.

In one example, sensors 52 feed sensor data to processor 40. The sensor data may include engine-monitoring data such as speed, oil temperature, water temperature, temperature inside the car cab, door open/shut conditions, etc. The sensors 52 are coupled to processor 40 through a link 54, such as a proprietary bus. A Compact Disc (CD) player 50 is coupled to the processor 40 through another link 48, such as a Universal Serial Bus (USB). Graphical User Interface (GUI) 56 displays the data associated with sensors 52 and CD player 50. The GUI 56 displays the outputs from sensors 52 using an icon 60 to identify temperature data and an icon 62 to identify car speed. The processor displays the CD player 50 as icon 62.

Figure 3:
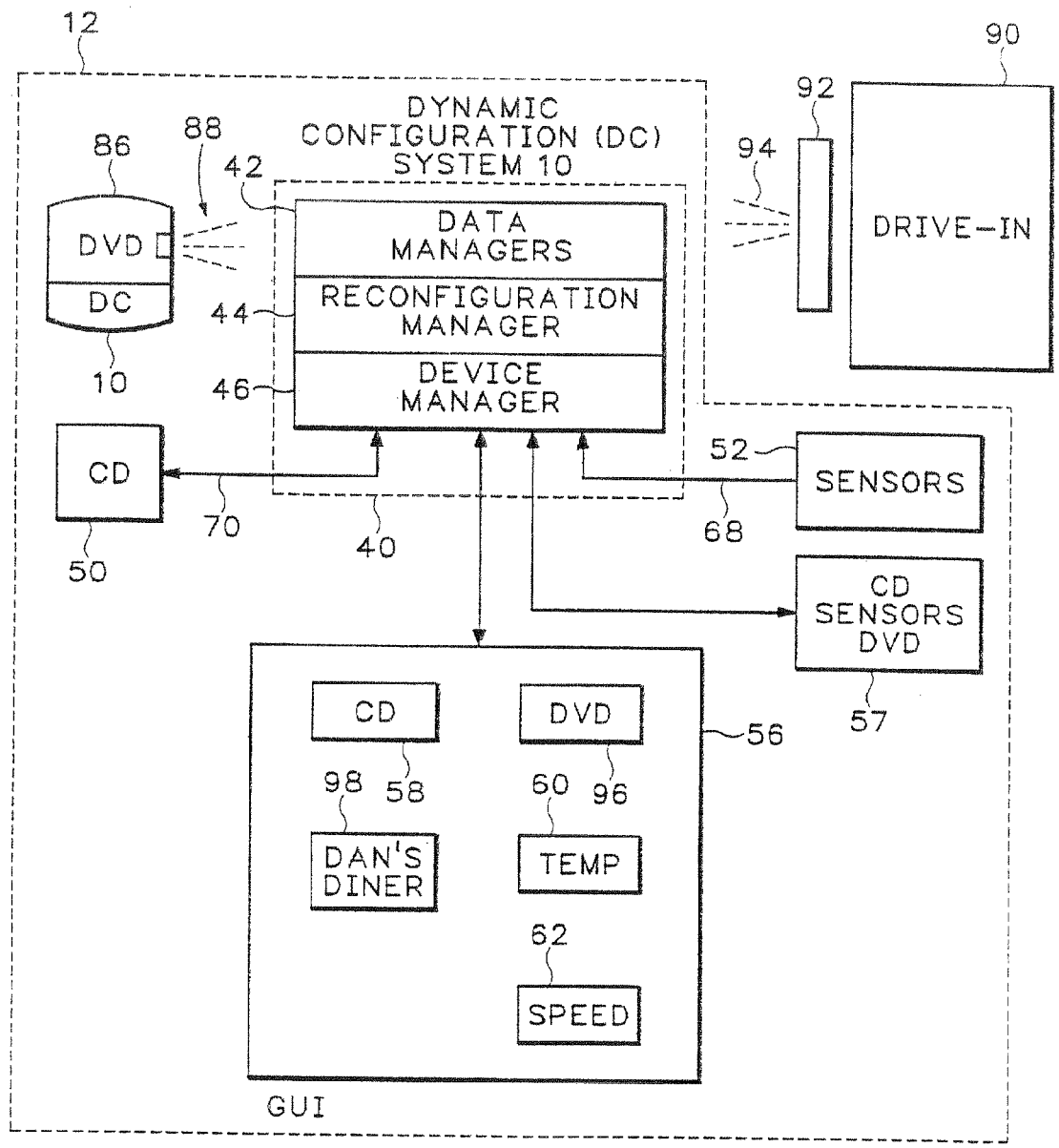
FIGS. 3 and 4 are diagrams showing an example of how the DC system operates.
Figure 4:
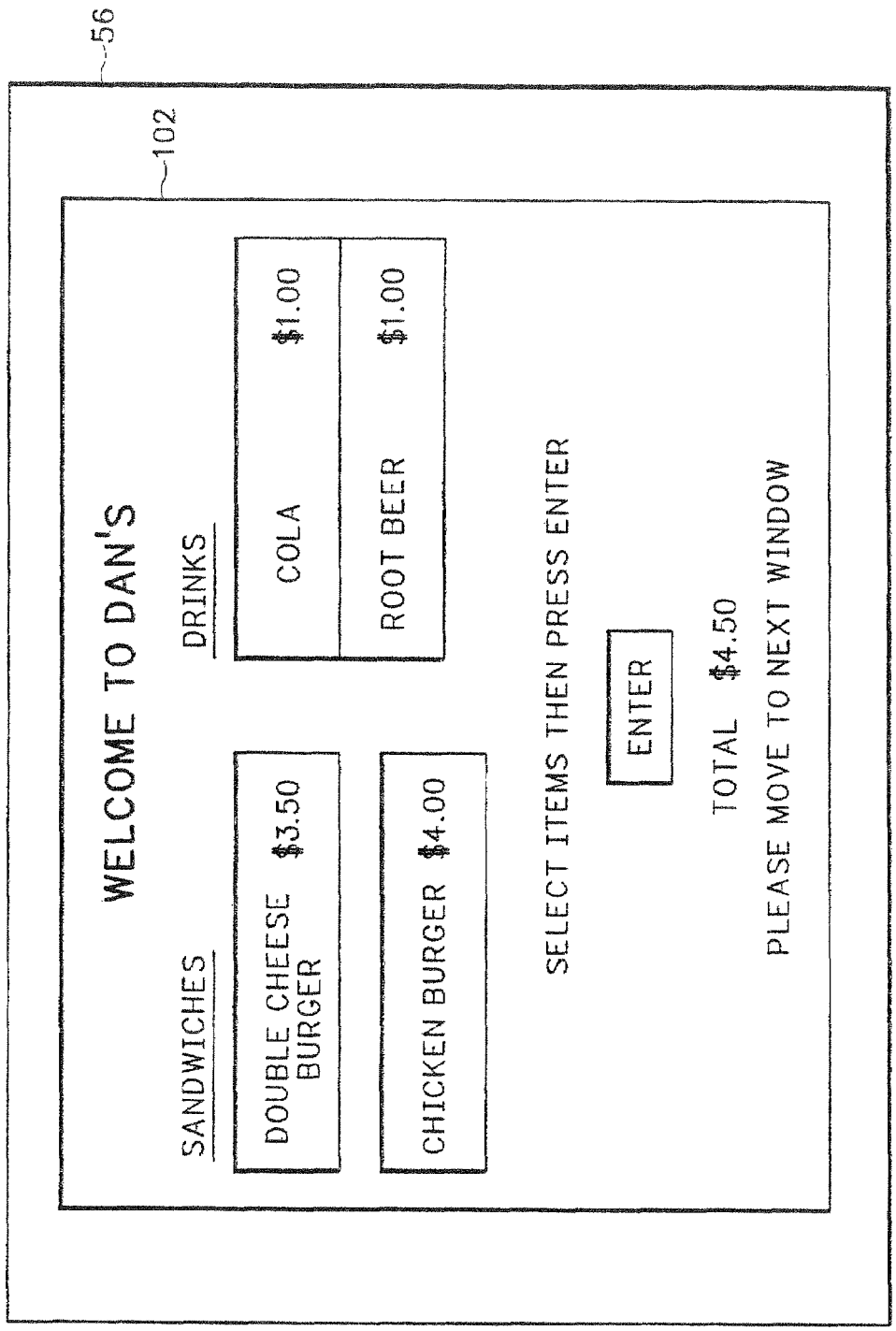

FIGS. 3 and 4 show an example of how two new applications are dynamically added to the multiprocessor system 8 in car 12 (FIG. 1). In FIG. 2, the DC system 10 in processor 40 previously detected a CD player 50 and some sensors 56. The CD player 50 was displayed on GUI 56 as icon 58 and the temperature and speed data from sensors 56 were displayed on GUI 56 as icons 60 and 62, respectfully.

The processor 40 is located in car 12 (FIG. 1). A passenger may bring a Digital Video Disc (DVD) player 86 into the car 12. The DVD 86 sends out a wireless or wired signal 88 to the processor 40. For example, the DVD 86 may send out signals using a IEEE 802.11 wireless protocol. The processor 40 includes an IEEE 802.11 interface that reads the signals 88 from DVD player 86. If the 802.11 protocol is identified as one of the protocols used by processor 40, the DC system 10 incorporates the DVD player 86 into a processor array 57 that lists different recognized applications.

The DC system 10 then automatically displays the newly detected DVD player 86 on GUI 56 as icon 96. If capable, the car operator by selecting the icon 96 can then display a video stream output from the DVD player 86 over GUI 56. The DVD player 86 can now be controlled from the GUI 56 on the car dashboard. This prevents the car driver from having to divert his eyes from the road while trying to operate the portable DVD player 86 from another location in the car, such as from the passenger seat.

Other processors or devices can also be incorporated into the multiprocessor system 8 in car 12. In another example, the car 12 drives up to a drive-in restaurant 90. The drive-in 90 includes a transmitter 92 that sends out a wireless Blue tooth signal 94. The processor 40 includes a Blue tooth transceiver that allows communication with transmitter 92. The DC system 10 recognizes the signals 94 from transmitter 92 and then incorporates the drive-in 90 into the multiprocessor system 8 (FIG. 1). The DC system 10 then displays the drive-in 90 as icon 98 in GUI 56.

Referring to FIG. 4, when the car operator selects the icon 98, a menu 102 for the driver-in 90 is displayed on the GUI 56. The car operator can then select any of the items displayed on the electronic menu 102. The selections made by the car operator are sent back to the transceiver 92 (FIG. 3). The amount of the order is calculated and sent back to the processor 40 and displayed on menu 102. Other messages, such as a direction for the car operator to move to the next window and pickup the order can also be displayed on the GUT 56. At the same time, the drive-in transceiver 92 (FIG. 3) may send audio signals that are received by the processor 40 and played out over speakers in car 12.

Figure 5:
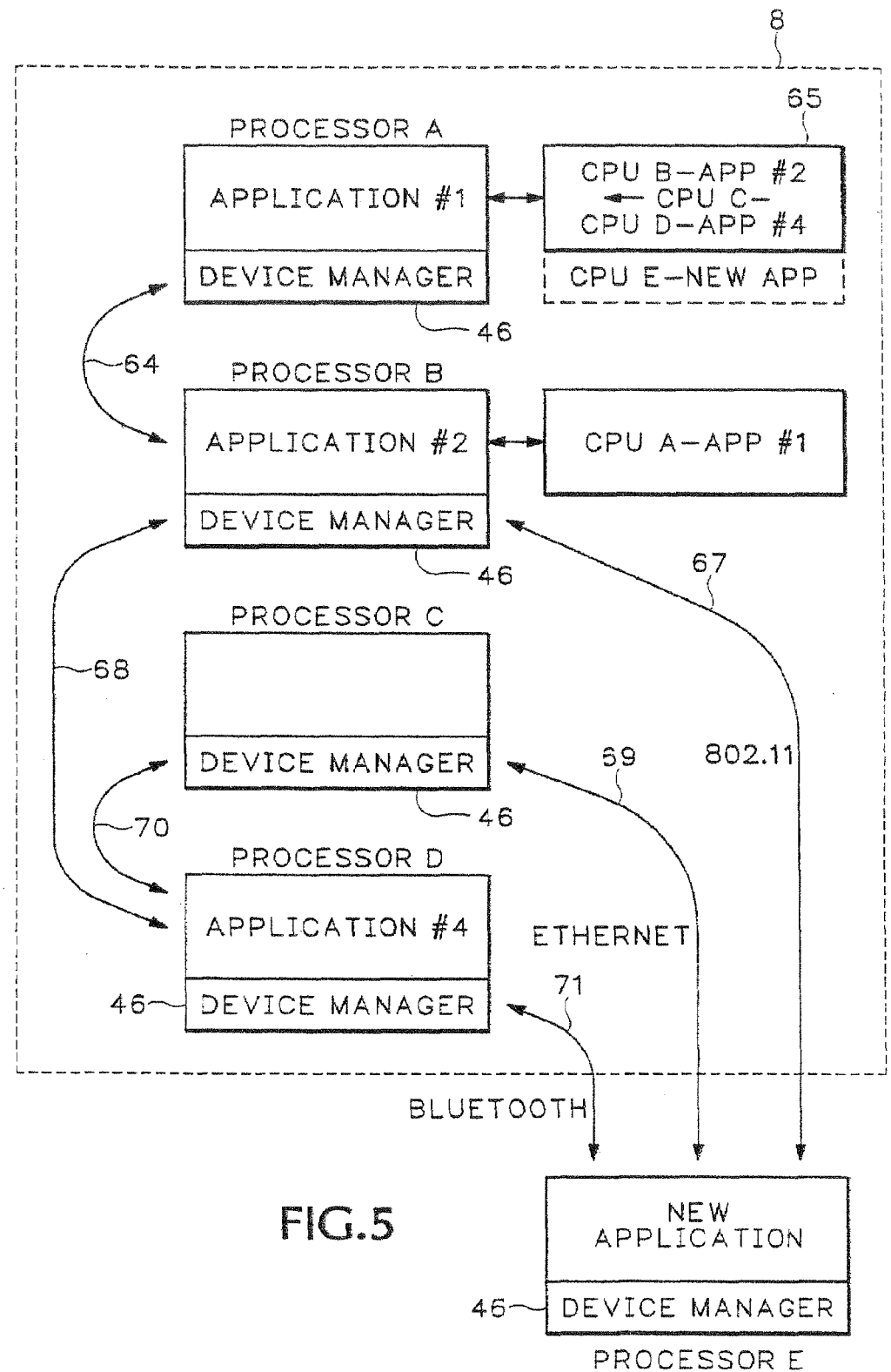
FIGS. 5 and 6 are diagrams showing how a device manager in the DC system operates.

FIG. 5 shows in more detail the operation of the device manager 46 previously shown in FIG. 2. Multiple processors A, B, C and D all include device managers 46. The device managers 46 can each identify other devices in the multiprocessor system that it communicates with. For example, processors A, B, C and D communicate to each other over one or more communication links including a Ethernet link 64, a wireless 802.11 link 68, or a blue tooth link 70.

Processor A includes a memory 65 that stores the other recognized processors B, C and D. The data managers 46 also identify any applications that may be running on the identified processors. For example, memory 65 for processor A identifies an application #2 running on processor B, no applications running on processor C, and an application #4 running on processor D.

Figure 6:
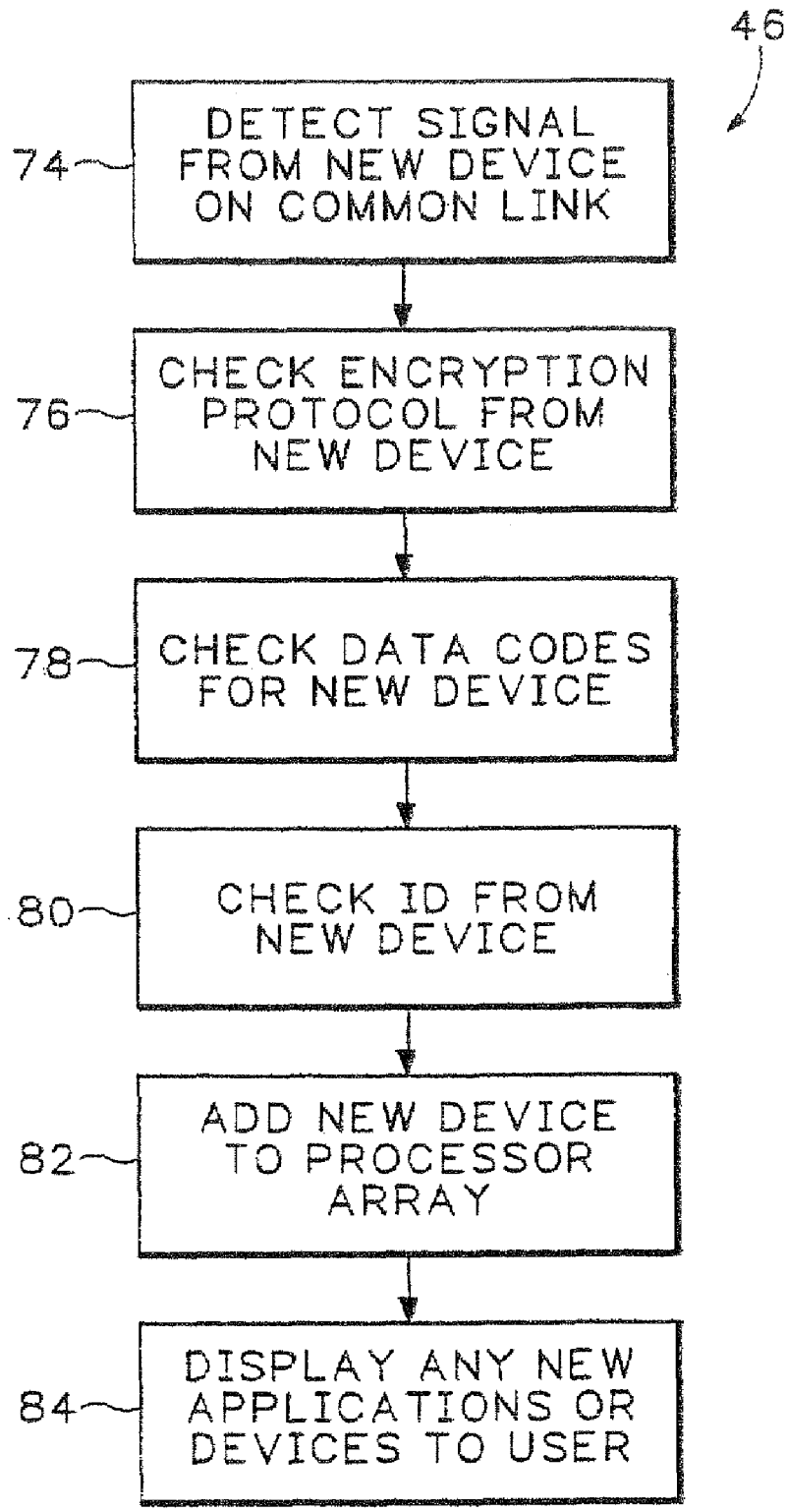

FIGS. 5 and 6 show how a new device is added to the multiprocessor system 8. Each of the existing processors A, B, C, and D after power-up are configured to identify a set or subset of the processors in the multiprocessor system 8. A new device 72 is brought into the multiprocessor system 8 either via a hardwired link or a wireless link. For example, the device E may send out signals over any one or more of a 802.11 wireless link 67, Blue tooth wireless link 71 or send out signals over a hardwired Ethernet link 69. Depending on what communication protocol is used to send signals, one or more of the processors A, B, C or D using a similar communication protocol detect the processor E in block 74 (FIG. 6). All of the processors may be connected to the same fiber optic or packet switched network that is then used to communicate the information from processor E to the other processors.

One of the device managers 46 in the multiprocessor system 8 checks the signals from processor E checks to determine if the signals are encrypted in a recognizable protocol in block 76. The device manager in the processor receiving the signals from processor E then checks for any data codes from the new device signals in block 76. The data codes identify data types used in one or more applications by processor E. A device ID for processor E is then determined from the output signals in block 80.

If all these data parameters are verified, the device managers 46 in one or more of the processors A, B, C and D add the new processor E to their processor arrays in block 82. For example, processor A adds processor E to the processor array in memory 65. After being incorporated into the multiprocessor system 8, the processor E or the applications running on the processor E may be displayed on a graphical user interface in block 84.

Figure 7:
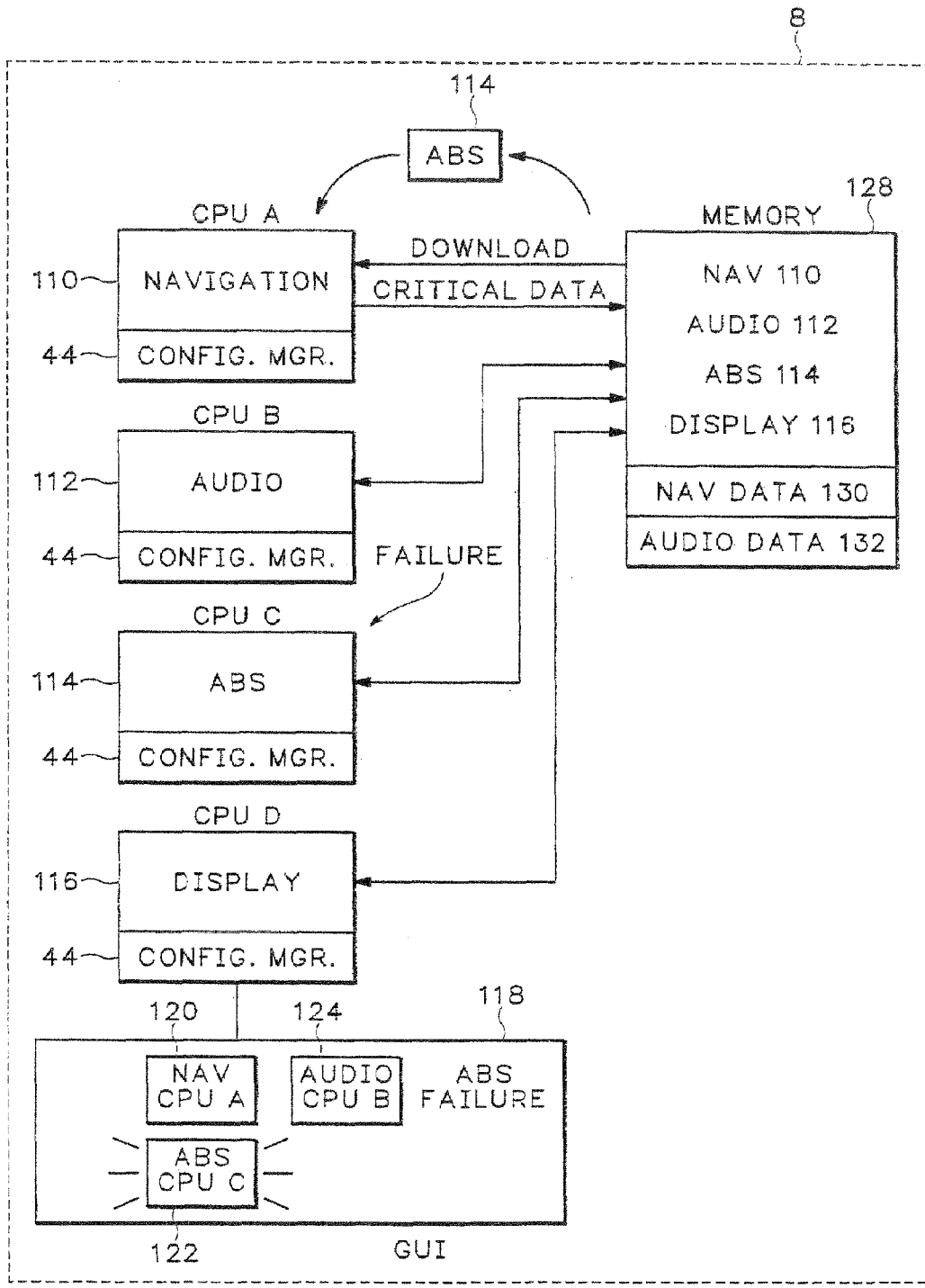
FIGS. 7-10 are diagrams showing how a reconfiguration manager in the DC system operates.

FIG. 7 describes in further detail the operation of the reconfiguration manager 44 previously described in FIG. 2. In the car multiprocessor system 8 there are four processors A, B, C and D. Of course there may be more than four processors running at the same time in the car but only four are shown in FIG. 7 for illustrative purposes. The processor A currently is operating a navigation application 110 that uses a Global Positioning System (GPS) to identify car location. Processor B currently runs an audio application 112 that controls a car radio and CD player. The processor C runs a car Automatic Braking System (ABS) application 114 and the processor D runs a display application 116 that outputs information to the car operator through a GUI 118.

The processor D displays an icon 120 on GUI 118 that represents the navigation system 110 running in processor A. An icon 124 represents the audio application running in processor B and an icon 122 represents the ABS application 114 running in processor C.

The memory 128 stores copies of the navigation application 110, audio application 112, ABS application 114 and display application 116. The memory 128 can also store data associated with the different applications. For example, navigation data 130 and audio data 132 are also stored in memory 128. The navigation data 130 may consist of the last several minutes of tracking data obtained by the navigation application 110. The audio data 132 may include the latest audio tracks played by the audio application 112.

The memory 128 can be any CD, hard disk, Read Only Memory (ROM), Dynamic Random Access (RAM) memory, etc. or any combination of different memory devices. The memory 128 can include a central memory that all or some of the processors can access and may also include different local memories that are accessed locally by specific processors.

Figure 8:
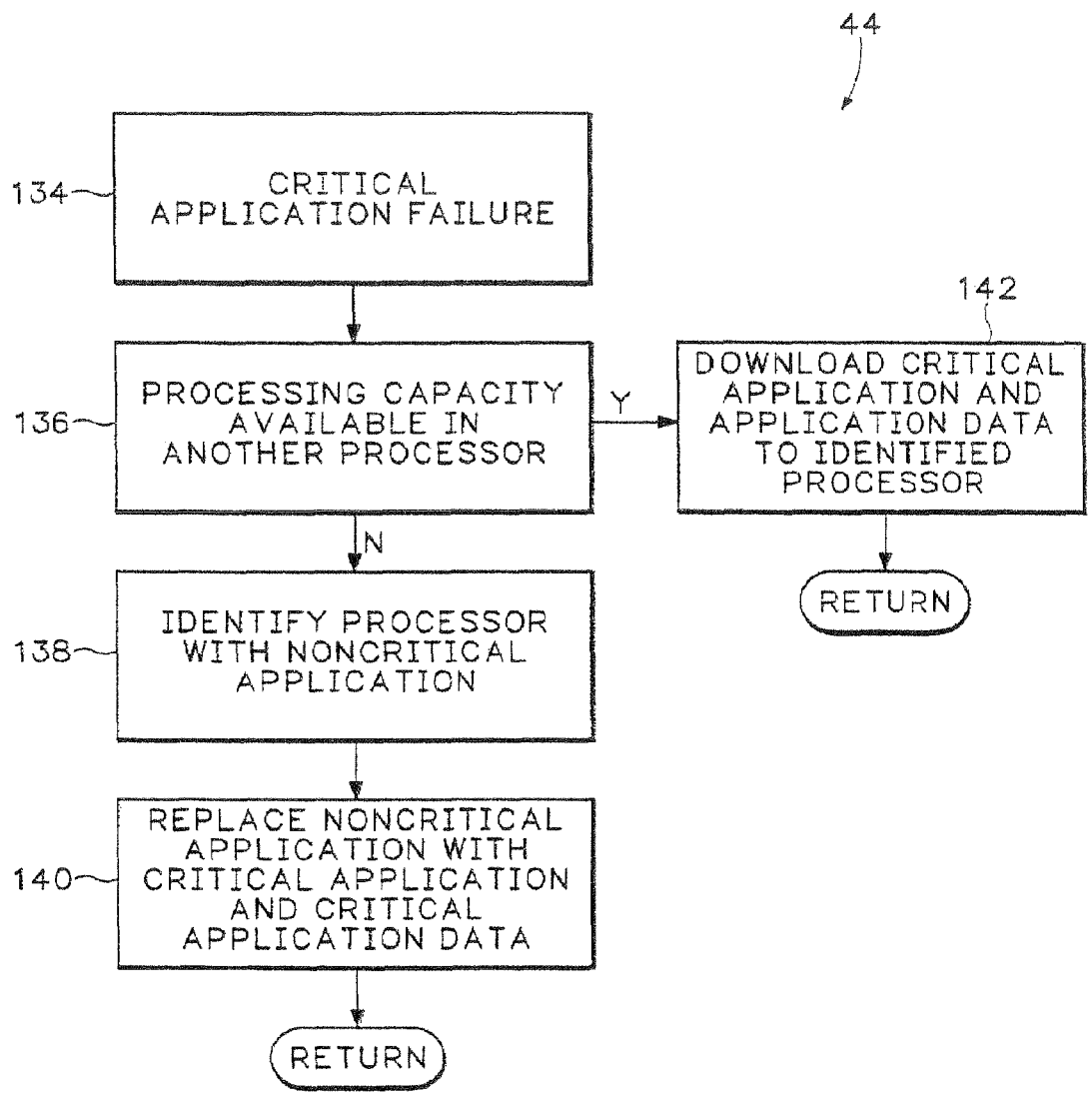

FIG. 8 shows one example of how the configuration manager 44 reconfigures the multiprocessor system when a failure occurs in a critical application, such as a failure of the ABS application 114. The configuration manager 44 for one of the processors in the multiprocessor system 8 detects a critical application failure in block 134.

One or more of the configuration managers 44 include a watchdog function that both monitors its own applications and the applications running on other processors. If an internal application fails, the configuration manager may store critical data for the failed application. The data for each application if stored in the memory 128 can selectively be encrypted so that only the car operator has the authority to download certain types of data. The configuration manager detecting the failure initiates a reboot operation for that particular application. The application is downloaded again from memory 128 and, if applicable, any stored application data. If the application continues to lockup, the configuration manager may then initiate a reconfiguration sequence that moves the application to another processor.

Failures are identified by the watchdog functions in one example by periodically sending out heartbeat signals to the other processors. If the heartbeat from one of the processors is not detected for one of the processors, the configuration manager 44 for the processor that monitors that heartbeat attempts to communicate with the processor or application. If the application or processor with no heartbeat does not respond, the reconfiguration process is initiated.

In another example, certain processors may monitor different applications. For example, a sensor processor may constantly monitor the car speed when the car operator presses the brake pedal. If the car speed does not slow down when the brake is applied, the sensor processor may check for a failure in either the braking application or the speed sensing application, If a failure is detected, the configuration manager initiates the reconfiguration routine.

When reconfiguration is required, one of the reconfiguration managers 44 first tries to identify a processor that has extra processing capacity to run the failed application in block 136. For example, there may be a backup processor in the multiprocessor system where the ABS application 114 can be downloaded. If extra processing resources are available, the ABS application 114 is downloaded from the memory 128 (FIG. 7) to the backup processor in block 142.

There may also be data associated with the failed application that is stored in memory 128. For example, the brake commands for the ABS application 114 may have been previously identified for logging in memory 128 using a logging label described in co-pending application entitled: OPEN COMMUNICATION SYSTEM FOR REAL-TIME MULTI-PROCESSOR APPLICATIONS, Ser. No. 09/841,753 filed Apr. 24, 2001 which is herein incorporated by reference. The logged brake commands are downloaded to the backup processor in block 142.

If no backup processing resources can be identified in block 136, the configuration manager 44 identifies one of the processors in the multiprocessor system that is running a non-critical application. For example, the configuration manager 44 may identify the navigation application 110 in processor A as a non-critical application. The configuration manager 44 in block 140 automatically replaces the non-critical navigation application 110 in processor A with the critical ABS application 114 in memory 128. The processor A then starts running the ABS application 114.

Figure 9:
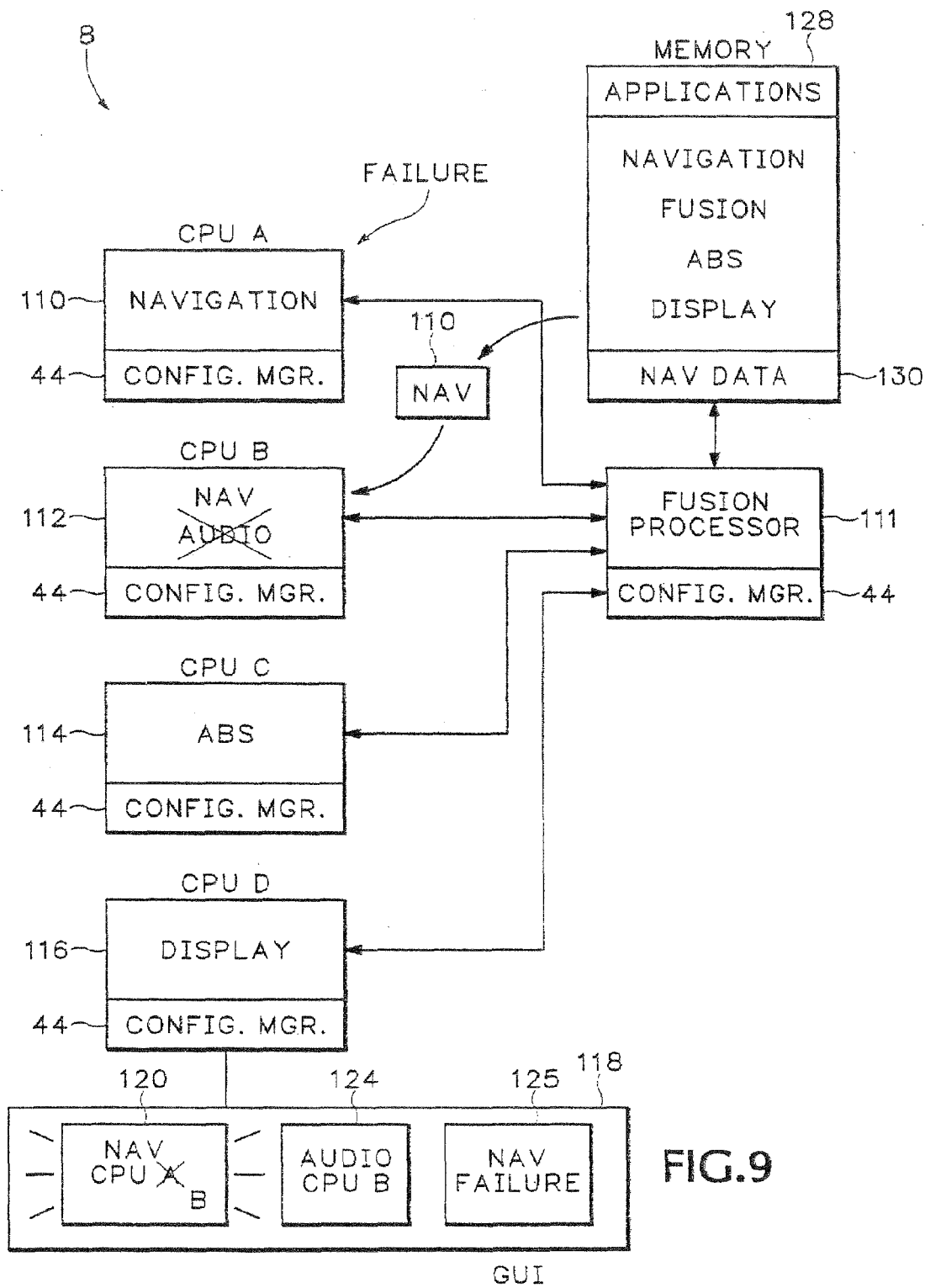
Figure 10:
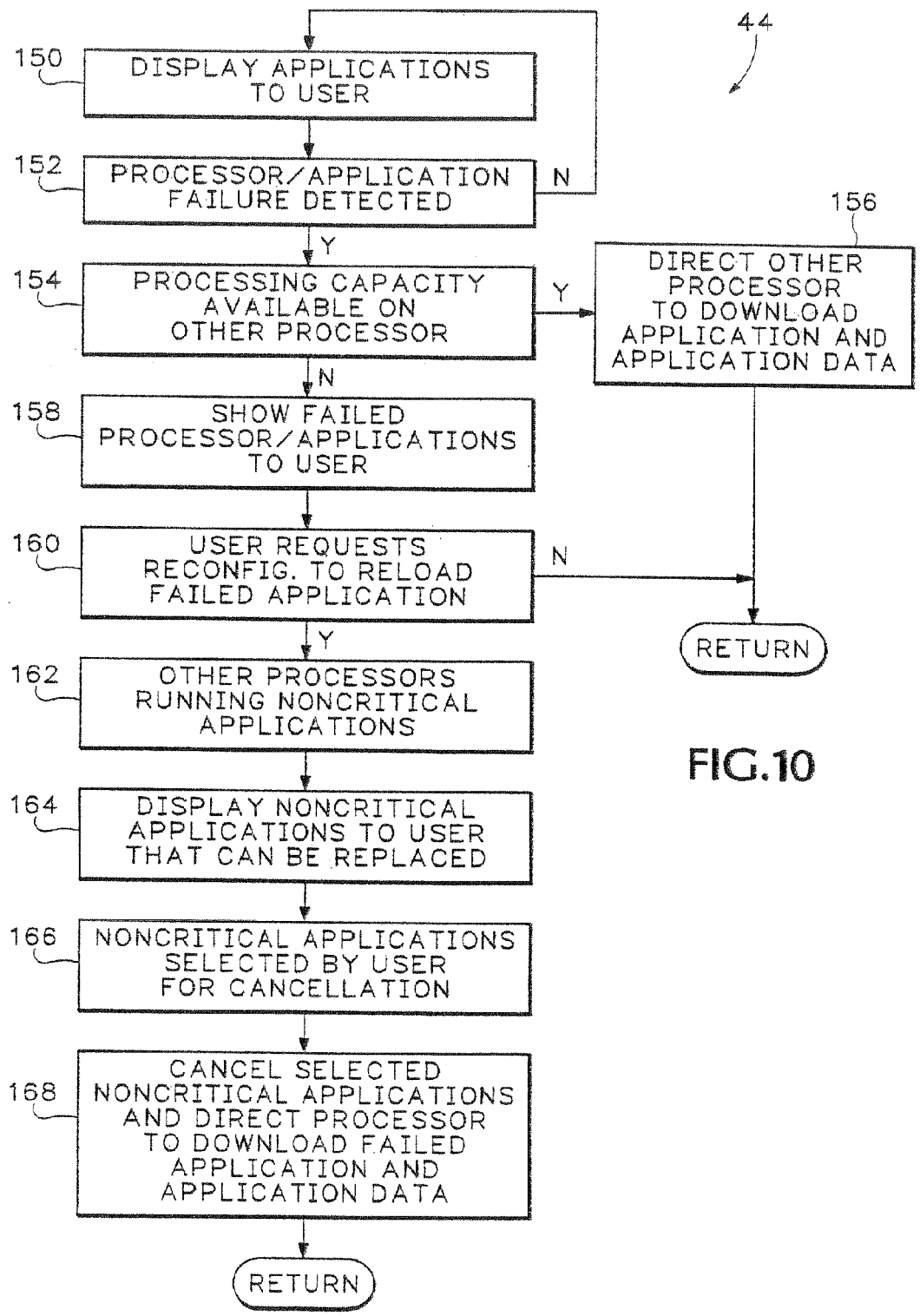

FIGS. 9 and 10 show an example of how the configuration manager 44 allows the user to control reconfiguration for non-critical applications. The applications currently running in the multiprocessor system 8 are displayed in the GUI 118 in block 150. A failure is detected for the navigation application 110 running in processor A in block 152. The configuration manager 44 in processor A, or in one of the other processors B, C, or D detects the navigation failure. Alternatively, a fusion processor 111 is coupled to some or all of the processors A, B, C and D and detects the navigation failure.

In block 154 the configuration manager 44 for one of the processors determines if there is extra capacity in one of the other processors for running the failed navigation application 110. If there is another processor with extra processing capacity, the navigation application is downloaded from memory 128 to that processor with extra capacity along with any necessary navigation data in block 156. This reconfiguration may be done automatically without any interaction with the car operator.

If there is no extra processing capacity for running the navigation application 110, the configuration manager 44 displays the failed processor or application to the user in block 158. For example, the GUI 118 in FIG. 9 starts blinking the navigation icon 120 in possibly a different color than the audio application icon 124. A textual failure message 125 can also be displayed on GUI 118.

The configuration manager in block 160 waits for the car operator to request reconfiguration of the failed navigation application to another processor. If there is no user request, the configuration managers return to monitoring for other failures. If the user requests reconfiguration, the configuration manager 44 in block 164 displays other non-critical applications to the user. For example, the GUI 118 only displays the audio application icon 124 in processor B and not the ABS application icon 122 (FIG. 7). This is because the audio application is a non-critical application and the ABS application 114 is a critical application that cannot be cancelled.

If the car operator selects the audio icon 124 in block 166, the configuration manager in block 168 cancels the audio application 112 in processor B and downloads the navigation application 110 from memory 128 into processor B. A logging manager in processor A may have labeled certain navigation data for logging. That navigation data 130 may include the last few minutes of position data for the car while the navigation application 110 was running in processor A. The logged navigation data 130 is downloaded from memory 128 along with the navigation application 110 into processor B. The navigation icon 120 in GUI 118 then shows the navigation application 110 running on processor B. At the same time the audio application icon 124 is removed from GUI 118.

Referring back to FIG. 2, a processor or application is accepted into the multiprocessor system by one or more of the device managers 46. The configuration managers 44 in the processors reconfigure the multiprocessor system to incorporate the processor or application. The data manager 42 then detects what type of data is transmitted or received by the new device and determines the different processors and input/output devices in the multiprocessor system that can receive or transmit data to the new application or processor.

FIG. 11 shows in further detail how the data manager 4A in FIG. 2 operates. In block 170, the data manager for one of the processors determines the data standard for the data that is either transmitted or received by a new device. For example, the new device may be a MP3 player that outputs streaming audio data. In another example, the new device may be a DVD player that outputs streaming video data in a MPEG format.

One or more of the data managers 42, identifies the device by its data and the data, if applicable, is displayed on the graphical user interface in block 172. The data manager then identifies any devices in the multiprocessor system that can output or transmit data to the new device in block 174. For example, a newly detected audio source may be output from a car speaker. The data manager monitors for any user selections in block 176. For example, the car operator may select the output from a portable CD player to be output from the car speakers. The data manager controlling the CD player and the data manager controlling the car speakers then direct the output from the CD player to the car speakers in block 178.

FIG. 12 gives one example of how the data managers 42 in the multiprocessing system operate. A GUI 180 displays the audio or video (A/V) sources in a car. For example, there are three devices detected in or around the car that are A/V sources. A cellular telephone detected in the car is represented by icon 184, a radio is represented by icon 186, and a DVD player is represented by icon 188.

The A/V output devices in the car are shown in the lower portion of GUI 180. For example, icons 192, 194, 196, 200, and 204 show car audio speakers. An in-dash video display is represented by icon 190 and a portable monitor is represented by icon 198.

Currently, a car operator may be listening to the radio 186 over speakers 192, 194, 196, 200 and 204. However, a passenger may move into the backseat of the car carrying an MP3 player. The MP3 player runs the DC system 10 described in FIG. 2 and sends out a signal to any other processors in the multiprocessor system 8 in the car. The device manager 46 and configuration manager 44 in one of the processors verify the data format for the MP3 player and configure the MP3 player into the multiprocessor system.

One of the data managers 42 determines the MP3 player outputs a MP3 audio stream and accordingly generates the icon 182 on the GUI 180. The data manager 42 also identifies a speaker in the MP3 player as a new output source and displays the speaker as icon 202. The car operator sees the MP3 icon 182 now displayed on GUI 180. The car operator can move the MP3 icon 182 over any combination of the speaker icons 192, 194, 196, 200 and 204. The output from the MP3 player is then connected to the selected audio outputs.

Audio data can also be moved in the opposite direction. The speaker icon 202 represents the output of the portable MP3 player that the passenger brought into the backseat of the car. The car operator also has the option of moving one or more of the other audio sources, such as the cellular telephone 184 or the radio 186 icons over the speaker icon 202. If the car operator, for example, moves the radio icon 186 over the MP3 player speaker icon 202 and the MP3 player can output the radio signals, the multiprocessor system redirects the radio broadcast out over the MP3 speaker.

Figure 13:
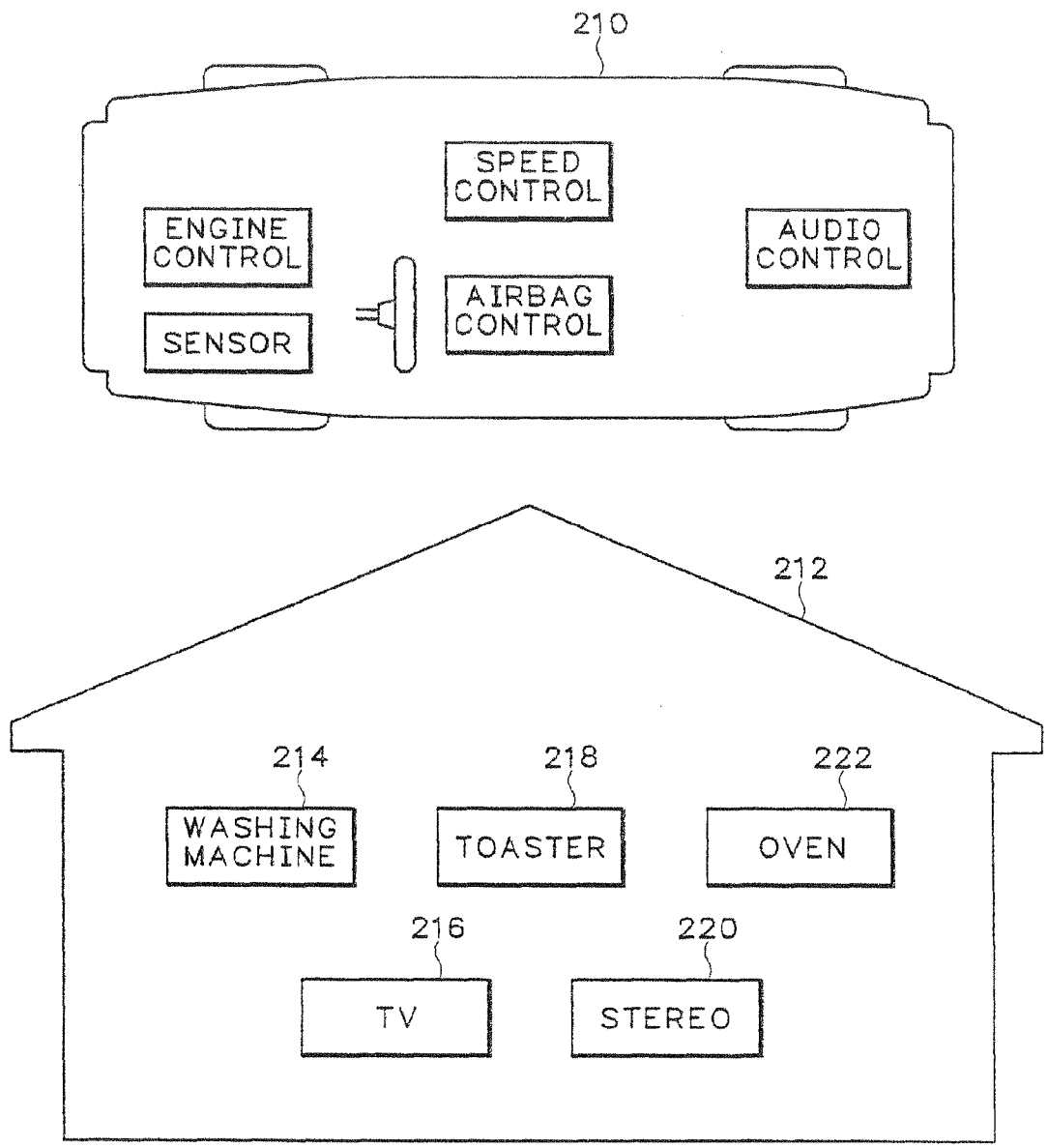
FIG. 13 is a diagram showing different multiprocessor systems that can use the DC DC system.

It should be understood that the multiprocessor system described above could be used in applications other than cars. For example, FIG. 13 shows a first GUI 210 that shows different processors and applications that are coupled together using the DC system 10 in an automobile. A GUI 212 shows another multiprocessor system comprising multiple processors in the home. For example, a washing machine is shown by icon 214. The DC system allows the washing machine processor to communicate and be configured with a television processor 216, toaster processor 218, stereo processor 220, and an oven processor 222.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A vehicle audio system, comprising:
   a wireless transceiver configured to wirelessly detect an audio source brought into or next to a vehicle; and
   logic circuitry responsive to detection of the audio source configured to:
   identify a security attribute associated with the audio source;
   use the identified security attribute to identify the audio source as an authorized audio source or an unauthorized audio source;

responsive to identifying the audio source as an authorized audio source, connect the audio source to an on-board processor and identify a type of data processed with a first software application operated by the audio source; and responsive to identifying the type of data, dynamically configure a second software application from within the vehicle to:
process the same type of data processed by the first software application operated by the audio source,
initiate transfer of the data from the audio source to the on-board processor, and
process the data received from the audio source, wherein the wireless transceiver is further configured to wirelessly detect an additional audio source brought into or next to the vehicle; and the logic circuitry is further configured to:
identify a security attribute associated with the additional audio source;
use the identified security attribute to identify the additional audio source as an authorized audio source or an unauthorized audio source;
responsive to identifying the additional audio source as an authorized audio source, connect the additional audio source to the on-board processor and identify a type of data processed with a third software application operated by the additional audio source, wherein the third software application is different from the first and second software applications; and
responsive to identifying the type of data, configure a fourth software application in the on-board processor, wherein the fourth software application is different from the first and second software applications, to:
process the same type of data processed by the third software application operated by the additional audio source,
initiate transfer of the data from the additional audio source to the on-board processor, and
process the data received from the additional audio source.

2. The vehicle audio system according to claim 1 wherein:
the on-board processor is not configured to run the second software application and not configured to receive and process the data from the audio source prior to identification of the audio source; and
in response to identifying the audio source, the on-board processor is configured to run the second software application and initiate transfer of the data from the audio source to the on-board processor.

3. The vehicle audio system according to claim 1 wherein the on-board processor is configured to:
display a first indicator of the audio source on an on-board display screen;
display a second indicator of the additional audio source on the on-board display screen;
in response to a selection on the on-board display screen, selectively connect the audio source to a first speaker located in a first section of the vehicle and connect the additional audio source to a second speaker located in a second section of the vehicle.

4. The vehicle audio system according to claim 1 wherein the audio source is a cell phone and the additional audio source is an MP3 player.

5. The vehicle audio system according to claim 1 wherein the logic circuitry is further configured to:
monitor a speed of the vehicle; and
configure the on-board processor to run the second application based on the speed of the vehicle.

6. The vehicle audio system according to claim 1 wherein the audio source comprises a cell phone.

7. The vehicle audio system according to claim 1 wherein the on-board processor is coupled to a display and is configured to control a readable and writeable data storage media.

8. The vehicle audio system according to claim 1 wherein the on-board processor is coupled to a display and the display is coupled to an internal vehicle radio system.

9. The vehicle audio system according to claim 1 wherein the on-board processor is configured to run a navigation system that operates in conjunction with a global positioning system.

10. The vehicle audio system according to claim 1 wherein the on-board processor is coupled to a display that includes a touch screen configured to operate as a user interface.

11. A vehicle data processing system, comprising:
a first data source in a vehicle;
a transceiver configured to wirelessly detect and identify a second data source brought into or next to a vehicle; and
a processor configured to:
identify a security attribute associated with the second data source;
allow a connection with the second data source based on the identified security attribute;
responsive to allowing the connection with the second data source, connect the data source to an on-board processor;
identify a type of data used in the second data source and processed with a first software application operated by the second data source;
identify a second software application located in memory in the vehicle;
dynamically configure and initiate the second software application in the on-board processor to control the second data source; and
initiate transfer of the data from the second data source to the on-board processor and use the second software application to process the data received from the second data source;
wherein the transceiver is configured to wirelessly detect and identify a third data source brought into or next to the vehicle; and
the processor is configured to:
identify a security attribute associated with the third data source;
allow a connection with the third data source based on the identified security attribute;
responsive to allowing the connection with the third data source, connect the third data source to the on-board processor;
identify a type of data used in the third data source and processed with a third software application operated by the third data source, wherein the third software application is different from the first and second software applications;
identify a fourth software application located in memory in the vehicle, wherein the fourth software application is different from the first and second software applications;
dynamically configure and initiate the fourth software application in the on-board processor to control the third data source; and
initiate transfer of the data from the third data source to the on-board processor and use the fourth software application to process the data received from the third data source.

12. The vehicle data processing system according to claim 11 wherein:
the second software application is not configured in the on-board processor prior to identification of the second data source and is configured to run in the on-board processor and initiate transfer of the data from the second data source to the on-board processor in response to identifying the second data source.

13. The vehicle data processing system according to claim 11 wherein the data includes audio data.

14. The vehicle data processing system according to claim 11 wherein the data includes video data.

15. The vehicle data processing system according to claim 11 wherein the data includes graphic data.

16. The vehicle data processing system according to claim 11 wherein the data includes text data.

17. The vehicle data processing system according to claim 11 wherein the on-board processor identifies the type of data exchanged with the second data source and associates the data with the second software application located in the memory of the vehicle.

18. An apparatus, comprising:
a processor configured to identify a device brought proximate to the processor, wherein the processor, responsive to identifying the device, is further configured to:
identify a security attribute associated with the device;
use the identified security attribute to allow a connection to the device;
responsive to allowing the device to be connected:
  connect the device to the processor;
  identify a first application on the device;
  dynamically configure a second application to provide at least some functions similar to the first application located on the device;
  initiate the second application, wherein the second application in response to being initiated is configured to:
    initiate transfer of data from the device to the processor, and
    perform some of the functions previously performed by the first application on the device;
the processor further configured to identify an additional device brought proximate to the processor, wherein the processor, responsive to identifying the additional device, is further configured to:
identify a security attribute associated with the additional device;
use the identified security attribute to allow a connection to the additional device;
responsive to allowing the additional device to be connected:
  connect the additional device to the processor;
  identify a third application on the additional device, wherein the third software application is different from the first and second software applications; and
  dynamically configure a fourth application to provide at least some functions similar to the third application located on the additional device;
  initiate the fourth application, wherein the fourth software application is different from the first and second software applications, and wherein the fourth application in response to being initiated is configured to:
    initiate transfer of data from the additional device to the processor, and
    perform some of the functions previously performed by the third application on the additional device.

19. The apparatus according to claim 18 wherein the second application is not configured on the on-board processor when the device is first identified by the processor.

20. The apparatus according to claim 18 wherein the processor removes the second application from the on-board processor when a communication link no longer exists with the device.

21. A vehicle audio system, comprising:
a wireless transceiver configured to wirelessly detect an audio source brought into or next to a vehicle; and
an application management system configured to:
  detect and establish communications with the audio source,
  check the audio source for an identification,
  check the audio source for an encryption key,
  check for data codes associated with the audio source,
  connect the audio source to the vehicle audio system,
  use the data codes to identify data types used in the audio source;
  identify a processor in the vehicle audio system that can input or output the identified data types; and
  in response to detecting the audio source, reconfigure the vehicle audio system to run a first application on the processor that processes the identified data types received from the audio source, wherein the vehicle audio system prior to detecting the audio source is not configured to run the first application and not configured to input or output the identified data types used in the audio source;
wherein the wireless transceiver is further configured to wirelessly detect an additional audio source brought into or next to the vehicle; and
the application management system is further configured to:
  detect and establish communications with the additional audio source,
  check the additional audio source for an identification,
  check the additional audio source for an encryption key,
  check for data codes associated with the additional audio source,
  connect the additional audio source to the vehicle audio system,
  use the data codes to identify data types used in the additional audio source; and
  in response to detecting the additional audio source, reconfigure the vehicle audio system to run a second application on the processor that processes the identified data types received from the additional audio source, wherein the second application is different from the first application and the vehicle audio system prior to detecting the additional audio source is not configured to run the second application and not configured to input or output the identified data types used in the additional audio source.

22. The vehicle audio system according to claim 21 wherein the audio source is a cellular telephone.

23. The vehicle audio system according to claim 21 wherein the audio source has an integrated display screen.

24. The vehicle audio system according to claim 23 wherein at least a portion of content received from the audio source is displayed on the integrated display screen.

25. The vehicle audio system according to claim 21 wherein the audio source includes a data storage device.

* * * * *